United States Patent [19]

Sonne et al.

[11] Patent Number: 4,638,164
[45] Date of Patent: Jan. 20, 1987

[54] HIGH RESOLUTION SCINTILLATION CRYSTAL

[75] Inventors: Darrell S. Sonne, Katy; Allen Nunley, Houston, both of Tex.

[73] Assignee: Halliburton Company, Duncan, Okla.

[21] Appl. No.: 661,636

[22] Filed: Oct. 17, 1984

[51] Int. Cl.$^4$ .................. G01V 5/06; G01T 1/208; G01T 1/202
[52] U.S. Cl. ............................. 250/366; 250/256; 250/363 R; 250/369
[58] Field of Search ............... 250/366, 369, 363 S, 250/363 R, 256, 261, 262

[56] References Cited

U.S. PATENT DOCUMENTS 2,711,482  6/1955  Goodman ........................... 250/260
3,895,232  7/1975  Schneeberger ..................... 250/366

FOREIGN PATENT DOCUMENTS 1368821 10/1974 United Kingdom ......... 250/363 SR

OTHER PUBLICATIONS

R. G. Astvatsaturov et al., "A Scintillation Counter 100 cm Long for Measurement of Ionization Losses of Relativistic Particles", *Pribory i Tekhnika Eksperimenta*, No. 2, (Mar.-Apr. 1975), pp. 62-65.

Primary Examiner—Bruce C. Anderson
Assistant Examiner—Constantine Hannaher
Attorney, Agent, or Firm—William J. Beard

[57] ABSTRACT

For use in downhole logging tools responsive to gamma rays or x-rays, an improved scintillation device is set forth. In the preferred and illustrated embodiment, a scintillation crystal, typically sodium iodide (thallium activated), is utilized. It is an elongated, regular structure having two ends, and separate photomultiplier tubes (PMT) are attached at the separate ends. The two PMT output signals are supplied to a circuit which forms a signal adjusted or modified to compensate for loss of light energy arising during transmission through the scintillation crystal to the PMT's.

7 Claims, 1 Drawing Figure

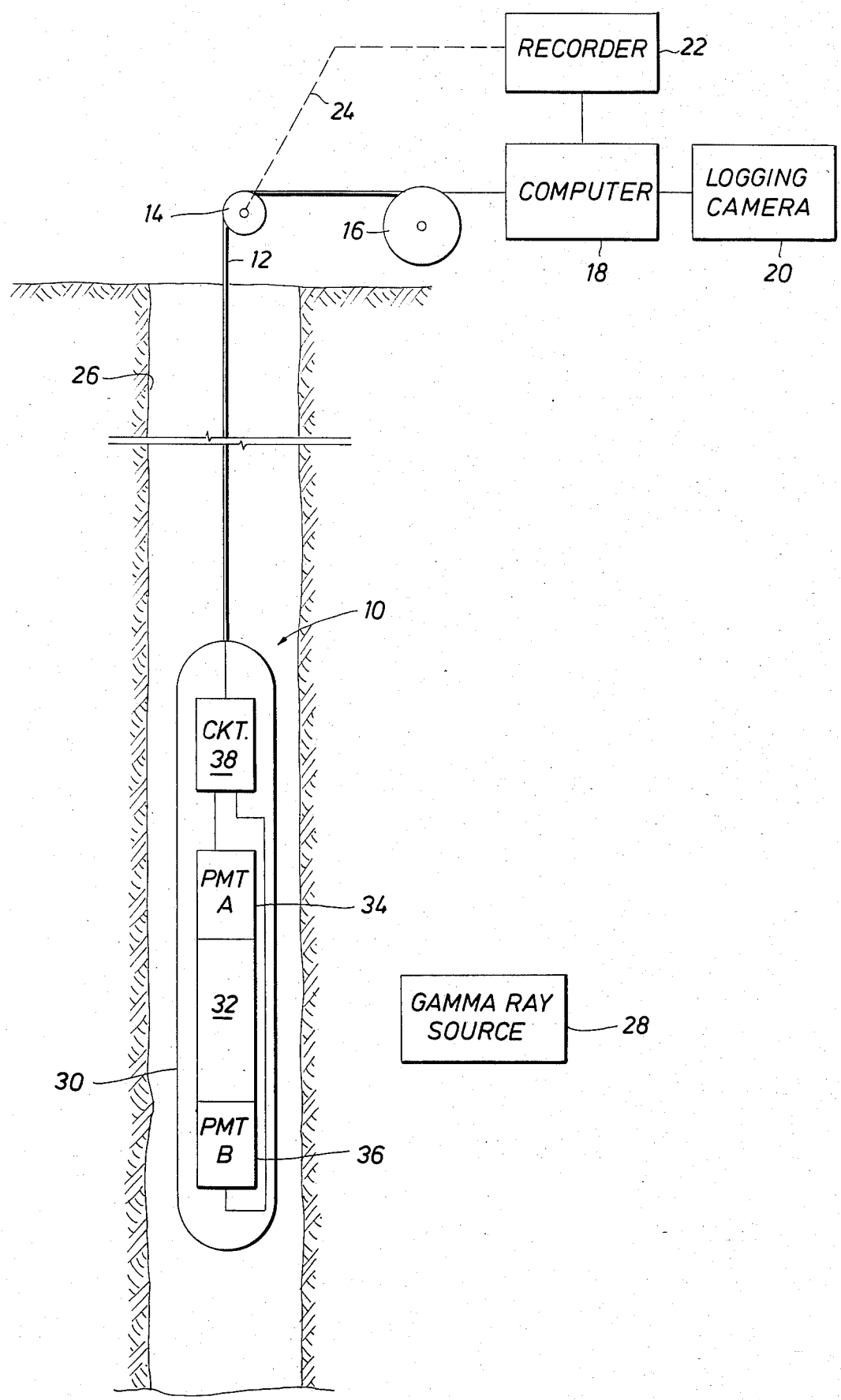

HIGH RESOLUTION SCINTILLATION CRYSTAL

BACKGROUND OF THE DISCLOSURE

A scintillation crystal used in a logging tool is typically an elongated, regular structure having a substantial cylindrical volume. It detects passage of gamma rays which converts to light and are called scintillation events. Such a passing gamma ray strikes or activates the crystal at random location within the crystal to create a flash of light. This momentary flash occurs at a specific location within the body or volume of the crystal. Assume for purposes of discussion that it occurs at the midpoint of the crystal between two equidistant ends. Further assume that the crystal is formed with mirrored walls which prevent the light from escaping the crystal. In whatever fashion the emission occurs, it radiates outwardly and is reflected, and the scintillation event is observed at the PMT at the end of the crystal. Assume that there are two PMTs deployed at opposite ends of the scintillation crystal. The light which is transmitted through the crystal body (either directly or through reflection) has an intensity which relates to the energy of the emission event. There is some energy loss between the precise point at which the light emission originates and the PMT transducers located at the ends of the scintillation crystal. There is a loss in measured energy as a result of reflection; there is also a loss to the degree that the scintillation crystal is not perfectly transparent or is cloudy.

The location in the crystal body where the scintillation originates thus erroneously changes the measure of energy observed by the PMT transducer system. As an example, if a scintillation event occurs precisely in front of a PMT, there is substantially less loss because there is a direct short path from the location to the transducer. The error arising from loss of energy is thus somewhat a function of the length of the scintillation crystal and the length from the scintillation event to the transducer that observes the event. Through the use of this apparatus, energy loss, either in transmission or reflection in the scintillation crystal body, is compensated. Thus, energy resolution can be improved and is made substantially independent of the location within the crystal body where the scintillation event occurs. This improves the resolution ability of a logging system incorporating a scintillation crystal.

The present invention is, therefore, briefly summarized as an improved detection system incorporating a regularly shaped, enlongate crystal body. The scintillation crystal body is constructed between two ends, having an PMT installed at each end. The output pulses from each PMT are input to a circuit which forms an output indicative of the corrected emission event energy level, the correction substantially overcoming energy losses arising from transmission or reflection within the crystal body.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

The single drawing sets forth a logging tool incorporating an improved scintillation crystal and photomultiplier tube arrangement in accordance with the teachings of this disclosure suspended on a wire line in a sonde for conducting well logging operations.

DETAILED DESCRIPTION OF THE PREFERRED EMBODIMENT

In the single drawing, the numeral 10 identifies a sonde which is lowered into a well bore and which encloses an apparatus for conducting logging operations. The sonde 10 is supported on an armored well logging cable 12 which is spooled over a sheave 14 at the surface. The cable 12 is supplied to a drum or reel 16 which stores the logging cable. The cable has a susbstantial length, easily being 25,000 feet (7.7 km) in length. The cable encloses one or more conductors which are connected with surface located data handling equipment, including a computer 18 which formats the data for recording. The data is supplied to the logging camera 20 to be recorded on strip chart film. Alternately, it is provided to a multitrack tape recorder 22. For purposes of registering the data relative to well depth, a mechanical or electronic depth indicating system 24 operated by the sheave inputs a depth measurement to the recorder 22 so that the data is captured as a function of depth, namely the depth of the sonde 10 in the well borehole.

The borehole is identified by the numeral 26. A gamma ray source has been represented generally at 28. As will be understood, any type of source which irradiates the sonde with radiation, typically in the form of neutrons or gamma rays, will suffice. It should be observed here that the source 28 can be materials in the earth formations adjacent to the borehole 26. That is, the source may well be the earth formations as a primary source. Alternatively, the source can be carried within the sonde 10 which irradiates the earth formations adjacent to the borehole whereupon some type of radiation response is transferred from the earth formations back toward the sonde 10. In another situation, the sonde is irradiated with either particles or photons which are observed wherein their energy measurements are important to obtaining adequate information about the well borehole undergoing logging.

The sonde 10 incorporates a surrounding pressure housing 20. It encloses a scintillation crystal 32. The crystal 32 is an elongated, regular structure having two ends. It has mirrored walls which reflect light from the interior to prevent its escape, and the light is observed by transducers at the two ends. At one end, a first PMT 34 is included, and the opposite end includes a similar PMT 36. For nomenclature, the PMT signals are labelled A and B. The output signals from the two PMTs are then provided to a circuit 38. It forms an output signal which is provided to the surface equipment on a conductor in the armored logging cable 12.

Consider a single scintillation event. Assume that it occurs somewhere within the crystal 32 and forms light which is emitted, reflected one or more times and ultimately transmitted to both ends. Two output signals are thus formed and provided to the circuit 38. The peak amplitude of the signals provided to the circuit 38 is related to the energy of the emission event. Thus, a first relationship can be set forth relating to the energy E of the emission event:

$$E = A + B + F(A,B) \quad (1)$$

In the foregoing equation, the peak amplitudes observed by the transducers 34 and 36 are identified by the symbols A and B. The energy of the emission event is identified by the symbol E. Thus, it can be seen that a correction factor compensating for energy loss is dependent on the term from equation one given by F(A,B). This is a term which approximates the light energy loss as a result of a reflection or transmission within a crystal body. As an approximation for energy loss, this term is then given by equation two:

$$F(A,B) = K_1 + K_2 \times \frac{|A - B|}{A + B} \quad (2)$$

The circuit 38 determines equation two so that the correction factor can then be added back into equation one. For purposes of illustration, assume that the peak amplitude of an emission event forms peak output signals of ten and eight arbitrary units for values A and B. Here, it will be observed that it does not really matter which of the two is ten units and which is eight units. Moreover, only the absolute value is significant in the computation of the correction factor. In this event, equation two will thus be seen dependent on the fraction 2/18. As will be understood, the fraction 2/18 is representative and the fraction may be quite different under other circumstances. Moreover, the fraction can be readily converted into a rather simplified value on a look-up table stored in ROM within the circuit 38. Here, precise calculation of this value to two or three digits of accuracy is not particularly needed. Indeed, the fraction might range anywhere between 0.00 to 1.00 (speaking theoretically) wherein the look-up table is broken down in increments of 0.05 and hence has twenty values. Such a look-up table finds ready use notwithstanding the fact that the energy level may vary markedly; for instance, in one emission event, terms A and B might be extremely small (two or three arbitrary units) while in another event, there might be several hundred fold larger. As will be observed from the form of the fraction, even with larger measures units of energy as measured to detectors, there is still a fraction within the range of one or less.

As will be observed, the flash of light observed by the two transducers is substantially instantaneous at both and hence, the output pulse amplitudes A and B occur simultaneously. This apparatus thus need not store either peak A or peak B; rather, they are simply formed by the two detectors, input to the circuit 38, summed and the correction factor added. This enables real time data to be provided by the circuit 38. A coincidence/anticoincidence circuit may also be employed to reduce the effects of PMT noise. The values A and B may be tested to assure that they exceed a specified threshold value.

An alternative arrangement of the present apparatus is to utilize a telemetry circuit connected to the detectors 34 and 36. The two PMT data streams flowing from them would thus be encoded and transmitted to the surface. At the surface, the computer 18 would then enable recordation of raw data from the two detectors in two different data tracks. At a more leisurely time, the two data tracks could then be examined to enable data manipulation as taught in equations one and two above to be accomplished. Thus, both the raw data and the corrected data would then be available. That is, the raw data is the data obtained without modification in accordance to equations 1 and 2. The recorded data would then be dual track peak measurements of the various emission events occuring within the crystal 32. Subsequent data reduction could then be undertaken in a more leisurely fashion wherein the constants $K_1$ and $K_2$ could be periodically tailored, as for instance, in the use of calibration standards and the like.

While many variations and changes in the structure of the drawing can be incorporated, the scope is determined by the claims which follow:

What is claimed is:

1. A scintillation detector for well logging usage and responsive to a gamma ray passage for providing a compensated output signal having a specified energy range comprising:
   (a) a single elongated scintillation crystal having specified physical configuration including two ends longitudinally spaced apart, said crystal converting a gamma ray passage event into a light emission having an origin within said crystal and wherein the light emission is attenuated by said crystal during light transmission to each of said end portions;
   (b) first and second photomultiplier tubes optically coupled to said end portions of said crystal for forming electrical signals output on detection of the light emission; and
   (c) circuit means connected to said first and second photomultiplier tubes for receiving the signals therefrom, said circuit means forming an output signal representative of the energy of the gamma ray passage event including a portion thereof compensating for the light emission lost by attenuation in said crystal means.

2. The apparatus of claim 1 wherein said circuit means forms an energy representative output signal having the form of:

$$E = A + B + F(A,B)$$

where E is the energy output representative signal,
A is the peak detected by the first photomultiplier means,
B is the peak detected by the second photomultiplier means, and
F is a predetermined function of a ratio of A and B.

3. The apparatus of claim 2 wherein the function F is dependent on the variable:

$$\left| \frac{A - B}{A + B} \right|$$

4. The apparatus of claim 3 wherein said circuit means receives peak amplitude signals from said first and second photomultiplier tubes.

5. The apparatus of claim 4 wherein each gamma ray passage event is time matched at said circuit means.

6. The apparatus of claim 5 wherein said crystal has a regular cross section perpendicular to the axis thereof between said ends thereof.

7. The apparatus of claim 2 wherein A and B must exceed specified threshold values.

* * * * *